United States Patent
Simanovski et al.

(10) Patent No.: US 11,303,090 B2
(45) Date of Patent: Apr. 12, 2022

(54) OPTICAL PARAMETRIC CHIRPED-PULSE AMPLIFIER

(71) Applicant: Coherent, Inc., Santa Clara, CA (US)

(72) Inventors: Dmitri Simanovski, Palo Alto, CA (US); Norman Hodgson, Belmont, CA (US)

(73) Assignee: Coherent, Inc., Santa Clara, CA (US)

( * ) Notice: Subject to any disclaimer, the term of this patent is extended or adjusted under 35 U.S.C. 154(b) by 413 days.

(21) Appl. No.: 16/546,178

(22) Filed: Aug. 20, 2019

(65) Prior Publication Data

US 2021/0057868 A1   Feb. 25, 2021

(51) Int. Cl.
| | |
|---|---|
| *H01S 3/091* | (2006.01) |
| *H01S 3/00* | (2006.01) |
| *H01S 3/23* | (2006.01) |
| *G02F 1/39* | (2006.01) |
| *H01S 3/067* | (2006.01) |
| *H01S 3/16* | (2006.01) |

(52) U.S. Cl.
CPC ............ *H01S 3/091* (2013.01); *H01S 3/0057* (2013.01); *H01S 3/0092* (2013.01); *H01S 3/06741* (2013.01); *H01S 3/06754* (2013.01); *H01S 3/1608* (2013.01); *H01S 3/2308* (2013.01); *G02F 1/392* (2021.01)

(58) Field of Classification Search
CPC ...... H01S 3/091; H01S 3/0057; H01S 3/0092; H01S 3/2383; G02F 1/392
See application file for complete search history.

(56) References Cited

U.S. PATENT DOCUMENTS

| | | | |
|---|---|---|---|
| 8,442,090 B1 * | 5/2013 | Perryman | G02F 1/39 |
| | | | 372/70 |
| 8,902,495 B2 * | 12/2014 | Clowes | H01S 3/067 |
| | | | 359/341.32 |
| 2010/0253769 A1 * | 10/2010 | Coppeta | H04N 13/337 |
| | | | 348/58 |
| 2012/0195330 A1 * | 8/2012 | Cho | H01S 3/0057 |
| | | | 372/6 |
| 2015/0338719 A1 | 11/2015 | Meundel et al. | |
| 2019/0163032 A1 * | 5/2019 | Gapontsev | H01S 3/0092 |

FOREIGN PATENT DOCUMENTS

EP   2924500 A1   9/2015

OTHER PUBLICATIONS

Fattahi, Hanieh, "Yb:YAG-Pumped, Few-Cycle Optical Parametric Amplifiers", Chapter 3, High Energy and Short Pulse Lasers, 2016, pp. 55-72.

(Continued)

*Primary Examiner* — Eric L Bolda
(74) *Attorney, Agent, or Firm* — Morrison & Foerster LLP

(57) ABSTRACT

An optical parametric chirped-pulse amplifier includes first and second optical parametric amplifier stages that successively amplify a stretched signal beam. A pulsed laser provides a fundamental beam. The second amplifier stage is pumped by the full power of a second-harmonic beam that is generated from the fundamental beam. A residual fundamental beam is used to generate another second-harmonic beam that pumps the first amplifier stage.

21 Claims, 3 Drawing Sheets

(56) References Cited

OTHER PUBLICATIONS

Manzoni et al., "Design Criteria for Ultrafast Optical Parametric Amplifiers", Journal of Optics, vol. 18, 2016, pp. 1-33.
International Search Report and written Opinion received for PCT Patent Application No. PCT/US2020/045648, dated Oct. 12, 2020, 12 pages.
Hadrich et al., "Degenerate optical parametric amplifier delivering sub 30 fs pulses with 2 GW peak power", Optics Express, vol. 16, No. 24, Nov. 24, 2008, pp. 19812-19820.

* cited by examiner

OPTICAL PARAMETRIC CHIRPED-PULSE AMPLIFIER

TECHNICAL FIELD OF THE INVENTION

The present invention relates in general to optical parametric chirped-pulse amplifiers. The invention relates in particular to optical pumping methods and apparatus for multi-stage optical parametric chirped-pulse amplifiers.

DISCUSSION OF BACKGROUND ART

In optical parametric amplification, an optically nonlinear crystal arranged for difference frequency generation is used to provide amplification of a beam of pulsed laser radiation. A pulsed "pump beam" and a shorter wavelength pulsed "signal beam" propagate together through the nonlinear crystal. Difference frequency generation converts a photon of the pump beam into a photon of the signal beam and a photon of an "idler beam". The energy of the idler photon is the difference in energy between the pump photon and the signal photon. Power is transferred from the pump beam to the signal beam and the idler beam, adding to the photons in the signal beam, thereby amplifying the signal beam. The nonlinear crystal is not significantly heated by the optical parametric amplification process, as each pump photon is fully converted into one signal photon and one idler photon.

There is no energy storage in the nonlinear crystal, as there is in conventional optical gain media. Accordingly, for optimum efficiency of the amplification process, the pulse durations of the pump beam and signal beam should be closely matched and the pulses should overlap temporally. Optical parametric amplification can provide an optical gain of several orders-of-magnitude in a nonlinear crystal that is just a few millimeters (mm) in length. This relatively-high gain means, in most cases, that no more than two amplification stages are required.

Optical parametric chirped-pulse amplification is used for amplifying a beam of ultra-short pulsed laser radiation. Ultra-short pulsed laser beams have broad spectral bandwidths. For example, pulses having durations less than 300 femtoseconds (fs) and corresponding spectral bandwidths greater than 3 nanometers (nm). In chirped-pulse optical parametric amplification, the pulses in a signal beam are temporally stretched prior to amplification, to maintain a peak intensity of the signal beam below an optical damage threshold during amplification. In particular, maintaining a peak intensity below an optical damage threshold of the nonlinear crystal, Stretching the signal pulses to durations of order one nanosecond makes it possible to apply much higher pump-pulse energies and therefore obtain much higher amplified signal-pulse energies. After amplification, the signal pulse can be temporally compressed, thereby producing an ultra-short amplified signal pulse having a high pulse energy and high peak power.

Stretching the signal pulses also eliminates need to use ultra-short pump pulses to match the ultra-short signal-pulses. A powerful and comparatively simple laser can provide a pump beam of nanosecond pump pulses. For example, a diode-pumped Q-switched solid-state laser having a neodymium ($Nd^{3+}$) or ytterbium ($Yb^{3+}$) doped gain-media, such as yttrium aluminum garnet (YAG) or yttrium orthovanadate ($YVO_4$). Typically, these lasers deliver a "fundamental beam" having a wavelength in the near-infrared region of the electromagnetic spectrum, between about 950 nm and 1100 nm. To provide pulses having a sufficiently short wavelength to be used as pump pulses for optical parametric amplification, a near-infrared fundamental beam must be converted to a "second-harmonic beam" having a wavelength that is one-half of the wavelength of the fundamental beam. For example, a second-harmonic beam having a wavelength in the visible region of the electromagnetic spectrum, between about 475 nm and 550 nm. Another optically nonlinear crystal is used to generate a second-harmonic beam from a fundamental beam.

In a typical prior-art two-stage optical parametric chirped-pulse amplification arrangement, a second-harmonic beam is divided into a higher-power beam and a lower-power beam, A fraction of the fundamental beam that is not converted into the second-harmonic beam is discarded. The lower-power beam is used to pump a first-stage amplifier and the higher-power beam is used to pump a second-stage amplifier. Approximately 80% of the second-harmonic beam is directed into the higher-power beam and approximately 20% of the second-harmonic beam is directed into the lower-power beam. A power ratio of 80% to 20% is typical, but other power ratios can be provided by suitable specification of beam-dividing elements. A chirped signal beam is amplified successively in the first-stage and second-stage amplifiers. A comprehensive detailed description of design criteria for optical parametric chirped-pulse amplifiers is provided in a tutorial article "Design criteria for ultrafast optical parametric amplifiers" by C. Manzoni and G. Cerullo, J. Opt. 18 (2016) 103501.

A significant shortcoming of the prior-art arrangement is that the conversion efficiency of the fundamental beam to the second-harmonic beam is, at best, about 50%. This conversion efficiency is limited by the spectral bandwidth of the signal beam being amplified and by temporal "walk off" as the beams propagate through the nonlinear crystal. Both limitations constrain the nonlinear crystal length to no more than a few millimeters. There is a considerable waste of the power in the fundamental beam. There is a need for a multi-stage optical parametric chirped-pulse amplifier that transfers power from a fundamental beam to a signal beam with a higher overall efficiency.

SUMMARY OF THE INVENTION

In one aspect, an optical amplifier apparatus in accordance with the present invention comprises a pulsed laser generating a beam of fundamental laser radiation. A first optically nonlinear crystal partially converts the fundamental beam into a first beam of second-harmonic laser radiation and leaves a residual beam of unconverted fundamental laser radiation. A second optically nonlinear crystal partially converts the residual fundamental beam into a second beam of second-harmonic laser radiation. A first optical parametric amplifier stage is optically pumped by the second second-harmonic beam and is arranged to amplify a signal beam. A second optical parametric amplifier stage is optically pumped by the first second-harmonic beam and arranged to further amplify the signal beam.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
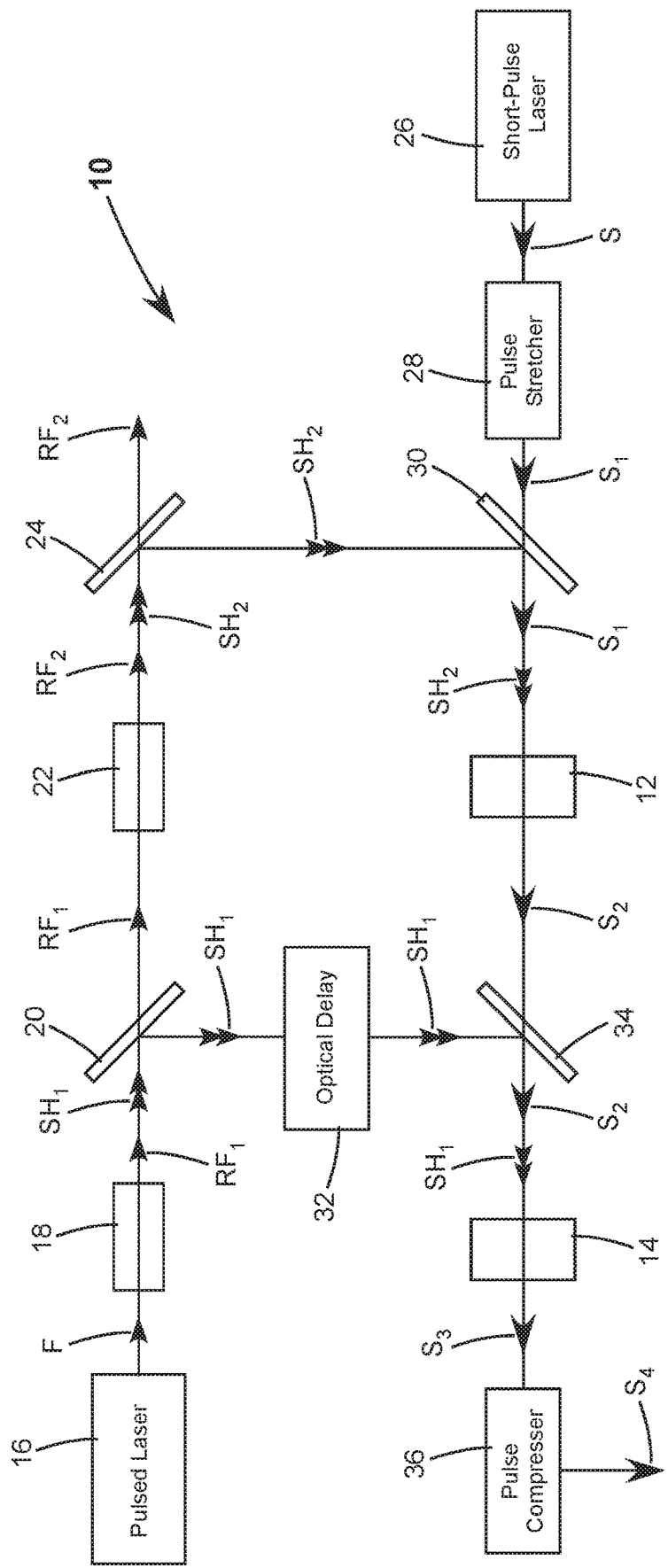
FIG. 1 schematically illustrates a preferred embodiment optical parametric chirped-pulse amplifier in accordance with the present invention, including a pulsed laser delivering a fundamental beam, a first nonlinear crystal generating a first second-harmonic beam from the fundamental beam, a second nonlinear crystal generating a second second-harmonic beam from a residual fundamental beam, the first and second second-harmonic beams optically pumping respectively a second amplifier stage and a first amplifier-stage.

Turning now to the drawings, wherein like features are identified by like reference numerals, FIG. 1 schematically illustrates a preferred embodiment of optical parametric chirped-pulse amplifier 10 in accordance with the present invention. Optical amplifier 10 comprises first and second optical parametric amplifier stages, 12 and 14 respectively, in the form of optically nonlinear crystals.

Optical amplifier 10 also includes a pulsed laser 16, which generates a beam of pulsed fundamental laser radiation, identified by single arrowheads F. A first optically nonlinear crystal 18, arranged for second-harmonic generation, partially converts fundamental beam F to a beam of pulsed second-harmonic laser radiation, identified by double arrowheads $SH_1$. The wavelength of second-harmonic beam $SH_1$ is half the wavelength of fundamental beam F. Second-harmonic generation leaves a residual beam of unconverted fundamental laser radiation $RF_1$. By way of example, second-harmonic beam $SH_1$ has about 50% of the power of original fundamental beam F. Equivalently, each original pulse of fundamental beam F is divided into a pulse of second-harmonic beam $SH_1$ and a pulse of residual fundamental beam $RF_1$, each pulse thereof having about 50% of the energy of the original pulse.

Second-harmonic beam $SH_1$ and residual fundamental beam $RF_1$ are spatially separated by a dichroic mirror 20, which reflects second-harmonic beam $SH_1$ and transmits residual fundamental beam $RF_1$. A second optically nonlinear crystal 22, also arranged for second-harmonic generation, partially converts residual fundamental beam $RF_1$ to a beam of pulsed second-harmonic laser radiation $SH_2$. Again, there is also a residual beam of unconverted fundamental laser radiation $RF_2$. Second-harmonic beam 5E12 and residual fundamental beam $RF_2$ are spatially separated by another dichroic mirror 24, which reflects second-harmonic beam $SH_2$. Dichroic mirror 24 transmits residual fundamental beam $RF_2$, which could be discarded or used to generate pump beams for additional preamplifier stages.

Residual fundamental beam $RF_1$, which is depleted by the second-harmonic generation in first nonlinear crystal 18, will generally have a longer pulse duration and lower beam quality than fundamental beam F. For these reasons, second-harmonic generation is generally less efficient in second nonlinear crystal 22 than in first nonlinear crystal 18. By way of example, residual fundamental beam $RF_1$ is converted into second-harmonic beam $SH_2$ with an efficiency in a range of about 10% to about 20%, with residual fundamental beam $RF_2$ having about 80% to about 90% of the power of residual fundamental beam $RF_1$. Second-harmonic beam $SH_2$ therefore has between about 10% and 20% of the power of second-harmonic beam $SH_1$. For optimum overall efficiency of optical amplifier 10, it is favorable to optimize the efficiency of second-harmonic generation in first nonlinear crystal 18. Nevertheless, conversion efficiencies of greater than 20% in second nonlinear crystal 22 can still be achieved by careful optimization.

A short-pulse laser 26 generates a beam of pulsed seed laser radiation, identified by large single arrowhead S, to be amplified in optical amplifier 10. Seed beam S has ultrashort pulses and a broad spectral bandwidth. Seed beam S is longer in wavelength than second-harmonic beams $SH_1$ and $SH_2$. By way of example, short-pulse laser 26 could include an ultrafast laser resonator and use supercontinuum generation to produce seed beam S.

Seed beam S is directed to a pulse stretcher 28, which is arranged to temporally stretch the ultrashort pulses, producing a stretched seed beam $S_1$. Pulses in stretched seed beam $S_1$ have a duration comparable to the pulses of second-harmonic beams $SH_1$ and $SH_2$. Pulse-stretcher arrangements, fixed and variable, are well known in the art. A detailed description thereof is therefore not necessary for understanding principles of the present invention and accordingly is not presented herein.

A dichroic mirror 30 receives second-harmonic beam $SH_2$, reflected from dichroic mirror 24, and directs second-harmonic beam $SH_2$ along a common path with stretched seed beam $S_1$ into first amplifier stage 12. Pulse generation in pulsed laser 16 and short-pulse laser 26 is synchronized such that pulses of second-harmonic beam $SH_2$ and pulses of stretched seed beam $S_1$ temporally overlap. Temporal overlap is required for optical parametric amplification during passage of these co-propagating beams through first amplifier stage 12. Second-harmonic beam $SH_2$ is a pump beam and stretched seed beam $S_1$ is a signal beam in first amplifier stage 12. The first-stage optical parametric amplification produces an amplified signal beam $S_2$.

Dichroic mirror 20 directs second-harmonic beam $SH_1$ through an optical delay 32. Second-harmonic beam $SH_1$ continues propagating onto another dichroic mirror 34, which directs second-harmonic beam $SH_1$ along a common path with amplified signal beam $S_2$. Optical delay 32 is arranged such that pulses of second-harmonic beam $SH_1$ and pulses of amplified signal beam $S_2$ overlap temporally during passage of these co-propagating beams through second amplifier stage 14. Second-harmonic beam $SH_1$ is a pump beam and amplified signal beam $S_2$ is a signal beam in second amplifier stage 14. The second-stage optical parametric amplification produces a further amplified signal beam $S_3$, which is the output beam from optical amplifier 10.

Amplified signal beam $S_3$ may be delivered to an optional pulse compressor 36, which is arranged to temporally compress the amplified stretched pulses, producing an amplified compressed signal beam $S_4$. The pulses in amplified compressed signal beam $S_4$ may have a duration comparable to the duration of the pulses in original seed beam S. Pulse-compressor arrangements are well known in the art and a detailed description thereof is not necessary for understanding principles of the present invention.

By way of example, fundamental beam F has a near-infrared wavelength and second-harmonic beams $SH_1$ and $SH_2$ have a corresponding visible wavelength. For example, a near-infrared wavelength in a range between 950 nm and 1100 nm. These beams may have pulse durations in a range from several hundred femtoseconds to several nanoseconds. First and second optically nonlinear crystals could be made of lithium triborate (LBO) or beta barium borate (BBO). The nonlinear crystals in the first and second amplifier stages could also be made of LBO or BBO.

Amplified signal beams $S_2$ and $S_3$ may be tuned over visible and infrared wavelengths by varying the wavelength of the seed beam and rotating the nonlinear crystals in the first and second amplifier stages. The center wavelength of the seed and signal beams may be any wavelength that can be phase matched for parametric amplification in the nonlinear crystals of the first and second amplifier stages. For a fundamental wavelength of about 1030 nm and a second-harmonic wavelength of about 515 nm, a properly oriented crystal made of LBO or BBO can amplify a beam having a wavelength in a range from 600 nm up to a wavelength where the material becomes opaque, which is greater than 2000 nm.

Figure 2A:
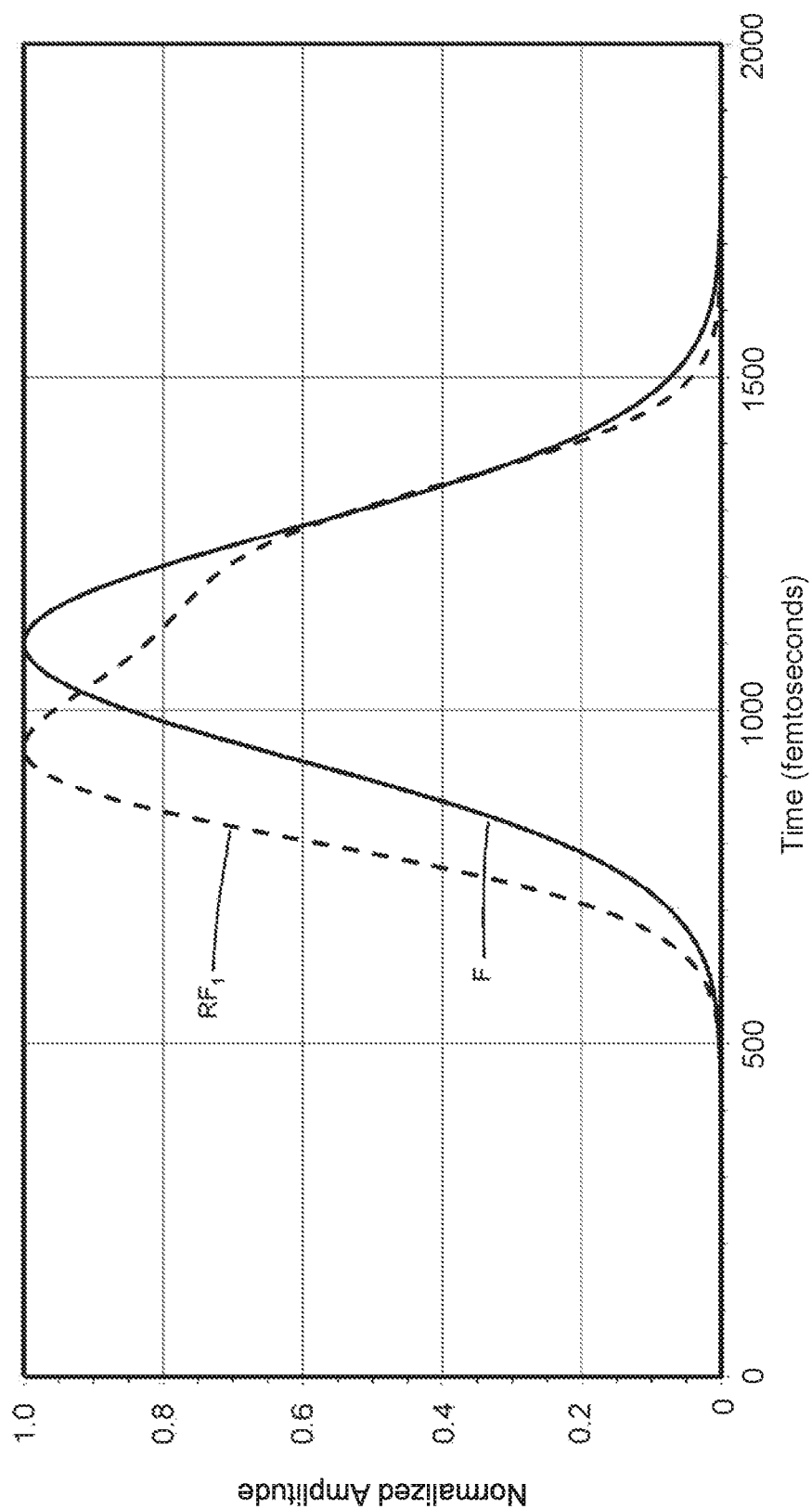
FIGS. 2A and 2B are graphs schematically illustrating normalized calculated power as a function of time for one pulse in each of the fundamental beam, the residual fundamental beam, the first second-harmonic beam, and the second second-harmonic beam in an example of the optical amplifier of FIG. 1.
Figure 2B:
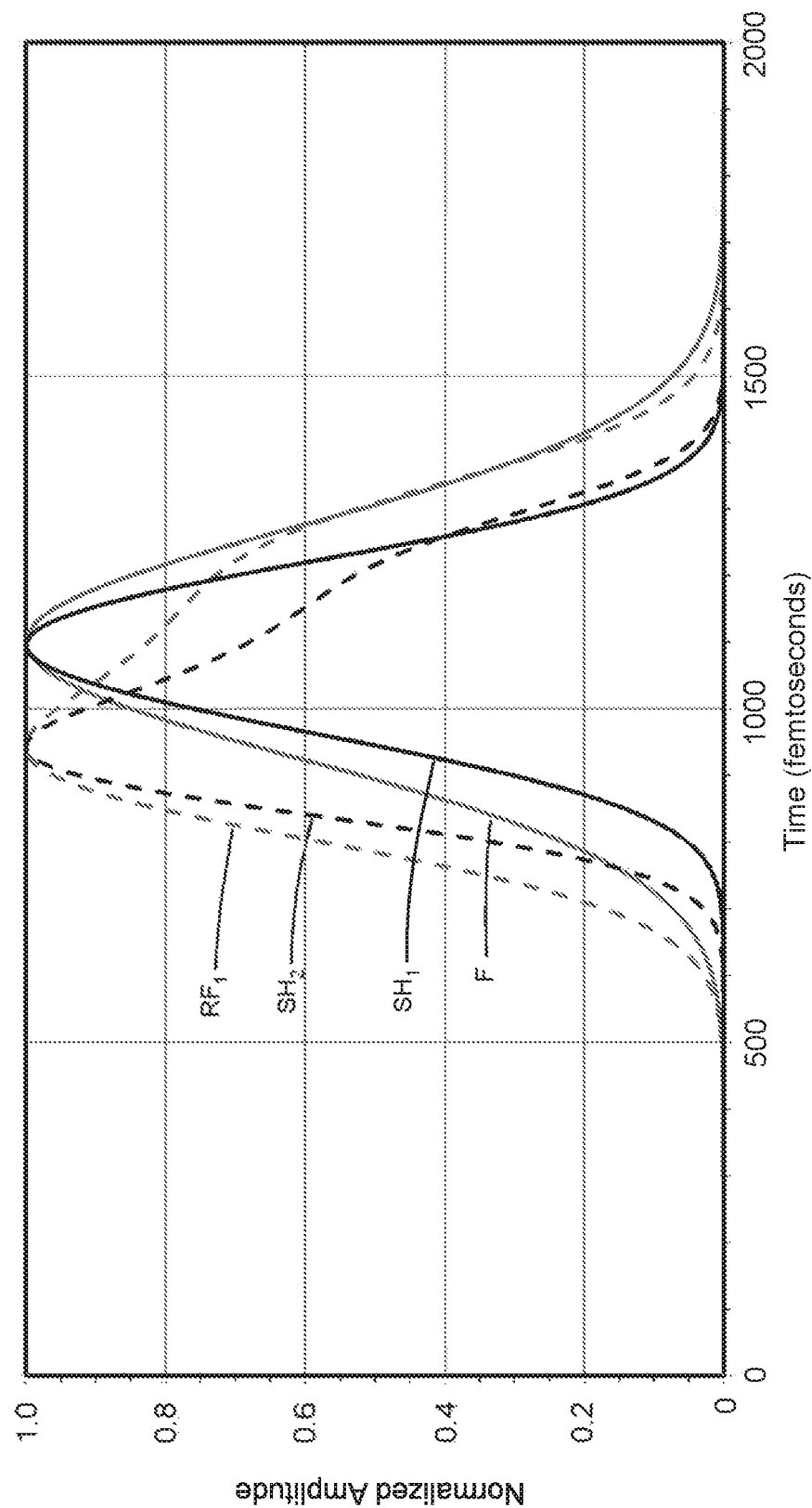

FIGS. 2A and 2B are graphs schematically illustrating normalized calculated power as a function of time, for a fundamental wavelength of 1030 nm and a second-harmonic wavelength of 515 nm, in an example of optical amplifier 10 of FIG. 1. In the example, second-harmonic laser radiation is generated by type-1 second-harmonic generation in BBO crystals. The drawings depict one pulse in each of fundamental beam F, residual fundamental beam $RF_1$, second-harmonic beam $SH_1$, and second-harmonic beam $SH_2$. These pulses overlap in the drawing for purposes of comparison.

FIG. 2A shows that second-harmonic generation of fundamental beam F in first nonlinear crystal 18 preferentially depletes the peak of a pulse of residual fundamental beam $RF_1$, which effectively increases the duration of this pulse. FIG. 2B shows that a pulse of second-harmonic beam $SH_2$ generated in second nonlinear crystal 22 therefore has a longer duration than a pulse of second-harmonic beam $SH_1$ generated in first nonlinear crystal 18. Lengthening the pulse of second-harmonic beam $SH_2$, in turn, lengthens the pulse of amplified stretched seed beam $S_2$ generated in first amplifier stage 12 and compensates for temporal gain narrowing in the first-stage optical parametric amplification. A longer pulse of amplified stretched seed beam $S_2$ has improved temporal overlap with a pulse of second-harmonic beam $SH_1$ in second amplifier stage 14, thereby increasing the efficiency of the second-stage optical parametric amplification.

The two-stage optical parametric chirped-pulse amplifier of the present invention offers a significant increase in overall efficiency over prior-art two-stage arrangements. All the power in second-harmonic beam $SH_1$ is directed into second amplifier stage 14. In contrast, in prior-art arrangements, only about 80% of the power in the second-harmonic beam is directed into the final amplifier stage. Directing all the power of the second-harmonic beam into the second amplifier stage can provide about 25% more gain to the signal beam in the second-amplifier stage. Meanwhile, the power in residual fundamental beam $RF_1$ is utilized to generate the pump beam for first amplifier stage 12, rather than being discarded as in prior-art arrangements. As discussed above, the pulse of amplified stretched beam $S_2$ has good temporal overlap with the pulse of second-harmonic beam $SH_1$ in second amplifier stage 14 of the present invention. In prior art arrangements, temporal gain narrowing in the first amplifier stage makes the signal pulse shorter than the pump pulse in the final amplifier stage, which limits power transfer from the pump pulse to the signal pulse. Overall, the inventive amplifier has about 50% higher efficiency than prior-art arrangements.

In summary, a stretched signal beam is amplified in a first optical parametric amplifier stage and then further amplified in a second optical parametric amplifier stage. A first nonlinear crystal converts a fundamental beam into a second-harmonic beam for pumping the second amplifier stage and leaves a residual fundamental beam. A second nonlinear crystal converts the residual fundamental beam into another second-harmonic beam for pumping the first amplifier stage.

The present invention is described above in terms of a preferred embodiment. The invention, however, is not limited by the embodiment described and depicted herein. Rather the invention is limited only by the claims appended hereto.

What is claimed is:

1. An optical amplifier, comprising:
   a pulsed laser generating a beam of fundamental laser radiation;
   a first optically nonlinear crystal partially converting the fundamental beam into a first beam of second-harmonic laser radiation and leaving a residual beam of unconverted fundamental laser radiation;
   a second optically nonlinear crystal partially converting the residual fundamental beam into a second beam of second-harmonic laser radiation;
   a first optical parametric amplifier stage optically pumped by the second second-harmonic beam and arranged to amplify a signal beam; and
   a second optical parametric amplifier stage optically pumped by the first second-harmonic beam and arranged to further amplify the signal beam.

2. The optical amplifier of claim 1, wherein the signal beam amplified in the first amplifier stage is generated by a short-pulse laser and stretched by a pulse stretcher.

3. The optical amplifier of claim 2, wherein pulse generation in the pulsed laser and in the short-pulse laser is synchronized to temporally overlap pulses of the second second-harmonic beam and pulses of the signal beam in the first amplifier stage.

4. The optical amplifier of claim 1, further including an optical delay arranged to temporally overlap pulses of the first second-harmonic beam and pulses of the signal beam in the second amplifier stage.

5. The optical amplifier of claim 1, wherein the amplified signal beam from the second optical amplifier is directed into a pulse compressor that is arranged to temporally compress the amplified signal beam.

6. The optical amplifier of claim 1, wherein the first and second nonlinear crystals are made of lithium triborate or beta barium borate.

7. The optical amplifier of claim 1, wherein the first and second amplifier stages are in the form of nonlinear crystals that are made of beta barium borate.

8. The optical amplifier of claim 1, wherein pulses of the second second-harmonic beam have a longer duration than pulses of the first second-harmonic beam.

9. The optical amplifier of claim 1, wherein the fundamental beam has a wavelength of between about 950 nanometers and about 1100 nanometers.

10. The optical amplifier of claim 9, wherein the fundamental beam has a wavelength of about 1030 nanometers.

11. An optical amplifier, comprising:
    a first optical parametric amplifier stage arranged to receive and to amplify a signal beam;
    a second optical parametric amplifier stage arranged to receive the amplified signal beam and to further amplify the signal beam;
    a pulsed laser generating a beam of fundamental laser radiation;

a first optically nonlinear crystal partially converting the fundamental beam into a first beam of second-harmonic laser radiation and leaving a residual beam of unconverted fundamental laser radiation, the first second-harmonic beam delivered to the second amplifier stage;

a second optically nonlinear crystal partially converting the residual fundamental beam into a second beam of second-harmonic laser radiation, the second second-harmonic beam delivered to the first amplifier stage; and an optical delay located between the first nonlinear crystal and the second amplifier stage, the optical delay arranged such that pulses of the amplified signal beam and pulses of the first second-harmonic beam overlap temporally in the second amplifier stage;

wherein generation of pulses of the fundamental beam and pulses of the signal beam is synchronized to overlap temporally pulses of the second second-harmonic beam and pulses of the signal beam in the first amplifier stage.

12. The optical amplifier of claim 1, wherein the signal beam amplified in the first amplifier is generated by a short-pulse laser and stretched by a pulse stretcher.

13. The optical amplifier of claim 1, wherein the amplified signal beam from the second optical amplifier is directed into a pulse compressor that is arranged to temporally compress the amplified signal beam.

14. The optical amplifier of claim 1, wherein the first and second nonlinear crystals are made of lithium triborate or beta barium borate.

15. The optical amplifier of claim 1, wherein the first and second amplifier stages are in the form of nonlinear crystals that are made of beta barium borate.

16. The optical amplifier of claim 1, wherein pulses of the second second-harmonic beam have a longer duration than pulses of the first second-harmonic beam.

17. The optical amplifier of claim 1, wherein the fundamental beam has a wavelength of between about 950 nanometers and about 1100 nanometers.

18. The optical amplifier of claim 17, wherein the fundamental beam has a wavelength of about 1030 nanometers.

19. A method of amplifying a signal beam, comprising the steps of:

generating a beam of fundamental laser radiation;

converting a portion of the fundamental beam into a first beam of second-harmonic laser radiation and leaving a residual beam of unconverted fundamental laser radiation;

converting a portion of the residual fundamental beam into a second beam of second-harmonic laser radiation;

directing the second second-harmonic beam to a first optical parametric amplifier stage that is optically pumped thereby and arranged to amplify the signal beam; and directing the first second-harmonic beam to a second optical parametric amplifier stage that is optically pumped thereby and arranged to further amplify the signal beam.

20. The method of claim 19, wherein the signal beam is pulsed, the pulses of the signal beam being stretched prior to amplification in the first optical parametric amplifier stage, and the pulses of the signal beam being compressed after amplification in the second optical parametric amplifier stage.

21. The method of claim 19, wherein the signal beam and the fundamental beam are pulsed, wherein generation of the signal beam pulses and the fundamental beam pulses is synchronized to temporally overlap pulses of the second second-harmonic beam and pulses of the signal beam in the first parametric amplifier stage.

* * * * *